US011982041B2

(12) United States Patent
Linden et al.

(10) Patent No.: US 11,982,041 B2
(45) Date of Patent: May 14, 2024

(54) SPRING-LOADED SIDE SWING HINGE WITH FEEDBACK ELIMINATION

(71) Applicant: Whirlpool Corporation, Benton Harbor, MI (US)

(72) Inventors: Aaron Linden, Granger, IN (US); Velan Kaveri, Dharmapuri (IN); Sagar Kumar, Ajmer (IN)

(73) Assignee: Whirlpool Corporation, Benton Harbor, MI (US)

( * ) Notice: Subject to any disclaimer, the term of this patent is extended or adjusted under 35 U.S.C. 154(b) by 505 days.

(21) Appl. No.: 17/183,018

(22) Filed: Feb. 23, 2021

(65) Prior Publication Data

US 2022/0267942 A1 Aug. 25, 2022

(51) Int. Cl.
*E05D 13/00* (2006.01)
*D06F 39/14* (2006.01)

(52) U.S. Cl.
CPC ........... *D06F 39/14* (2013.01); *E05D 13/123* (2013.01); *E05D 2700/02* (2013.01); *E05Y 2900/312* (2013.01)

(58) Field of Classification Search
CPC . E05D 11/10; E05D 11/1007; E05D 11/1014; E05D 2700/02; E05F 3/22; E05F 1/1246; E05F 1/1253; E05F 1/1261; Y10T 292/1043; Y10T 292/17; Y10T 292/1092
USPC .................................................... 16/321, 388
See application file for complete search history.

(56) References Cited

U.S. PATENT DOCUMENTS 2,626,420 A * 1/1953 Georges .................. E05F 5/027 16/80
2,901,277 A * 8/1959 Anderson ............. E05C 19/024 292/78
3,503,380 A * 3/1970 Vasaturo ............... E05F 1/1261 126/191
3,594,030 A * 7/1971 Paetz ...................... E05C 19/10 292/108
3,638,277 A * 2/1972 Coe ..................... E05D 11/1014 16/291

(Continued)

FOREIGN PATENT DOCUMENTS

CN 109083529 A * 12/2018 ............. E05D 7/081
CN 109083529 A 12/2018

(Continued)

*Primary Examiner* — Emily M Morgan
(74) *Attorney, Agent, or Firm* — Harness, Dickey & Pierce, PLC

(57) ABSTRACT

A spring-loaded hinge assembly including a hinge support bracket and a leaf that is pivotally mounted to the hinge support bracket. A coil spring is supported on a spring support member, which includes a pivot bush. The coil spring applies a biasing force to the spring support member, which operates to push the pivot bush against a cam on the leaf. A lock configured to rotate between locked and unlocked positions includes a finger that engages an engagement feature on the hinge support bracket when the lock rotates to the locked position as the leaf swings toward the open position. In the locked position, the lock holds the coil spring in a partially compressed, pre-load condition and the pivot bush at a partially retracted position relative to the cam until the lock is subsequently released by contact between the cam and the pivot bush during subsequent closure.

20 Claims, 7 Drawing Sheets

(56) References Cited

U.S. PATENT DOCUMENTS

| | | | | | |
|---|---|---|---|---|---|
| 3,985,380 | A * | 10/1976 | Raivio | E05C 19/14 292/120 |
| 4,186,953 | A * | 2/1980 | O'Connor | B60J 9/02 292/210 |
| 4,573,333 | A * | 3/1986 | Choi | E05B 47/0002 292/201 |
| 4,635,454 | A * | 1/1987 | Brown | E05C 3/24 292/216 |
| 6,290,270 | B1 | 9/2001 | Spiessl | |
| 7,306,266 | B2 | 12/2007 | Hapke et al. | |
| 7,676,888 | B2 * | 3/2010 | Vanini | E05F 1/1261 16/277 |
| 8,250,706 | B2 | 8/2012 | Vanini | |
| 10,458,167 | B2 | 10/2019 | Collene et al. | |
| 2005/0172683 | A1 * | 8/2005 | Haber | E05C 3/045 70/210 |
| 2007/0283532 | A1 * | 12/2007 | Vanini | F24C 15/023 16/277 |
| 2009/0064458 | A1 * | 3/2009 | Vanini | E05F 1/1261 16/304 |
| 2014/0208542 | A1 * | 7/2014 | White | E05D 7/12 16/261 |
| 2015/0345185 | A1 * | 12/2015 | Farooq | E05B 79/20 292/194 |
| 2021/0262255 | A1 * | 8/2021 | Blum | B64C 1/1407 |
| 2021/0372187 | A1 * | 12/2021 | Lee | E05F 3/20 |

FOREIGN PATENT DOCUMENTS

| | | | | |
|---|---|---|---|---|
| CN | 109695391 | A * | 4/2019 | E05D 11/1064 |
| EP | 3095940 | A1 | 11/2016 | |

* cited by examiner

SPRING-LOADED SIDE SWING HINGE WITH FEEDBACK ELIMINATION

FIELD

The present disclosure relates generally to spring-loaded hinge assemblies for pivotally mounting an appliance door to an appliance, including for example, spring-loaded hinge assemblies for pivotally mounting laundry load doors on washing machines and dryers.

BACKGROUND

The statements in this section merely provide background information related to the present disclosure and may not constitute prior art.

Spring-loaded hinge assemblies are frequently utilized to pivotally mount appliance doors to residential and commercial appliances, such as washing machines and dryers. The spring in these hinge assemblies provides a biasing force/spring force that is applied to the leaf of the hinge assembly to hold the door closed during operation of the appliance, such as during tumbling, for example. While this biasing force helps ensure the appliance door remains closed, it also produces an associated closing force/closing resistance. For example, typical spring-loaded hinge assemblies exhibit closing resistance in the last/final fifteen to twenty degrees of closure and this may be seen as an undesirable trade-off associated with the biasing force that helps keep the door closed during operation of the appliance. What is needed is an improved spring-loaded hinge assembly that reduces the closing resistance in the last portion of hinge movement prior to closure, while still retaining sufficient spring force to hold the appliance door closed during appliance operation.

SUMMARY

This section provides a general summary of the disclosure, and is not a comprehensive disclosure of its full scope or all of its features.

In accordance with one aspect of the present disclosure, a spring-loaded hinge assembly is provided. The spring-loaded hinge assembly includes a hinge mechanism with a hinge support bracket and a leaf that is pivotally mounted to the hinge support bracket. As such, the leaf is configured to swing between open and closed positions. The spring-loaded hinge assembly also includes a coil spring that is supported on a spring support member and a pivot bush that is supported on the spring support member. The leaf includes a cam and the pivot bush is positioned to contact the cam. The coil spring applies a biasing force to the spring support member, which operates to push the pivot bush against the cam. Thus, the biasing force of the spring also defines an associated closing force of the spring-loaded hinge assembly.

The spring-loaded hinge assembly also has a lock that is rotatable relative to both the spring support member and the hinge support bracket. The lock is configured to rotate between locked and unlocked positions and includes a finger that is positioned to engage an engagement feature on the hinge support bracket when the lock rotates to the locked position as the leaf swings toward the open position. In the locked position, the lock operates to hold the coil spring in a partially compressed, pre-load condition and the pivot bush in a partially retracted position relative to the cam until the lock is subsequently released by contact between the cam and the pivot bush during a subsequent closure of the hinge mechanism. Advantageously, the spring-loaded hinge assembly described herein provides a reduced closing force/closing resistance in the last portion of hinge movement prior to closure, while still retaining sufficient biasing force/spring force to hold an appliance door closed during the operation of an appliance.

BRIEF DESCRIPTION OF THE DRAWINGS

Other advantages of the present disclosure will be readily appreciated, as the same becomes better understood by reference to the following detailed description when considered in connection with the accompanying drawings wherein.

DETAILED DESCRIPTION

Figure 1:
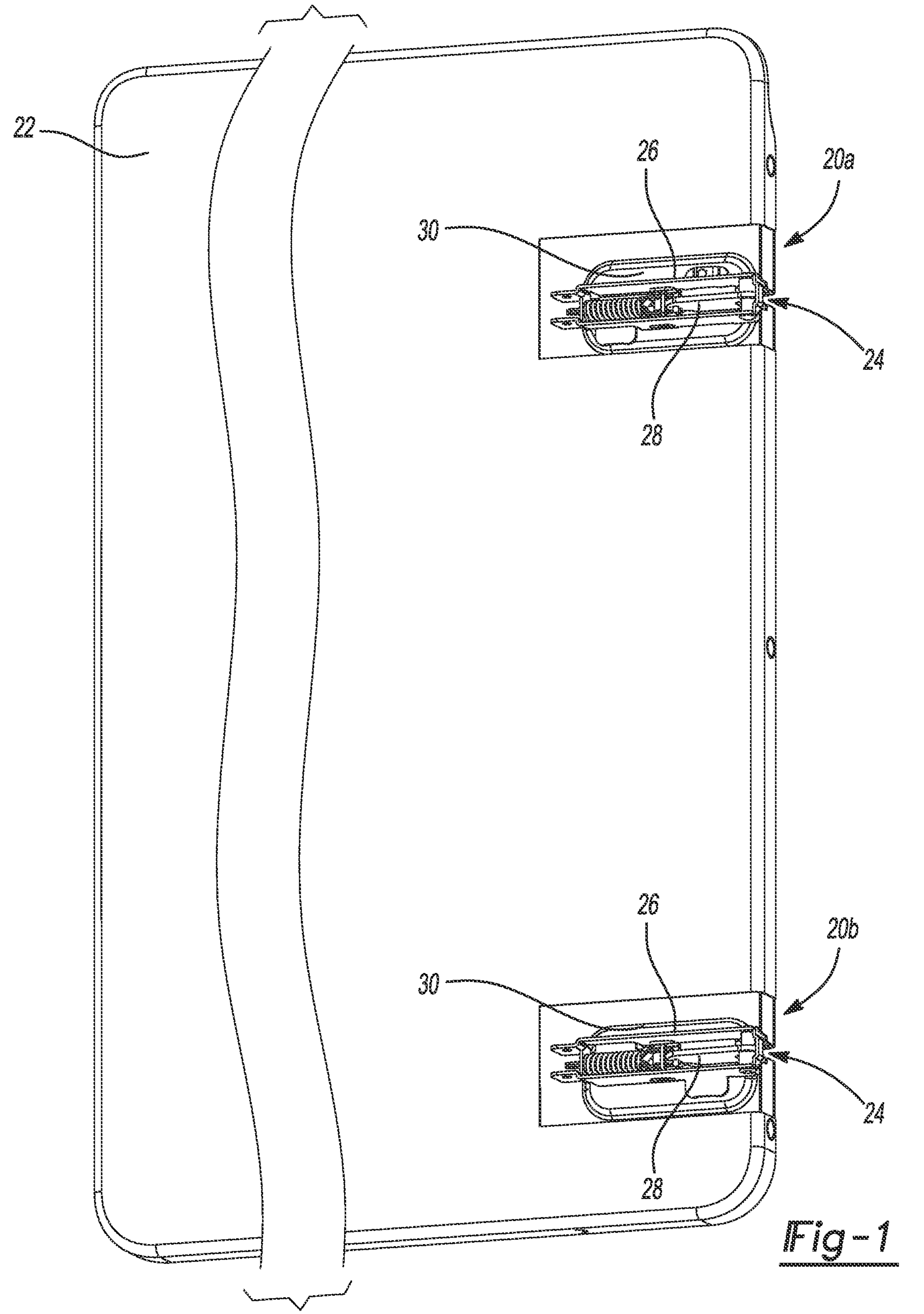
FIG. 1 is a front perspective section view of exemplary spring-loaded hinge assemblies that are mounted to an exemplary appliance door and that are constructed in accordance with the teachings of the present disclosure.

Referring to the Figures, wherein like numerals indicate corresponding parts throughout the several views, a spring-loaded hinge assembly 20 for pivotally mounting an appliance door 22 to an appliance is illustrated.

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

For purposes of description herein the terms "up," "down," "above," and derivatives thereof shall relate to the device as oriented in FIGS. 3-8. However, it is to be understood that the apparatus and assemblies described herein may assume various alternative orientations, including when installed on an application, like in the orientations shown in FIGS. 1 and 2.

Figure 2:
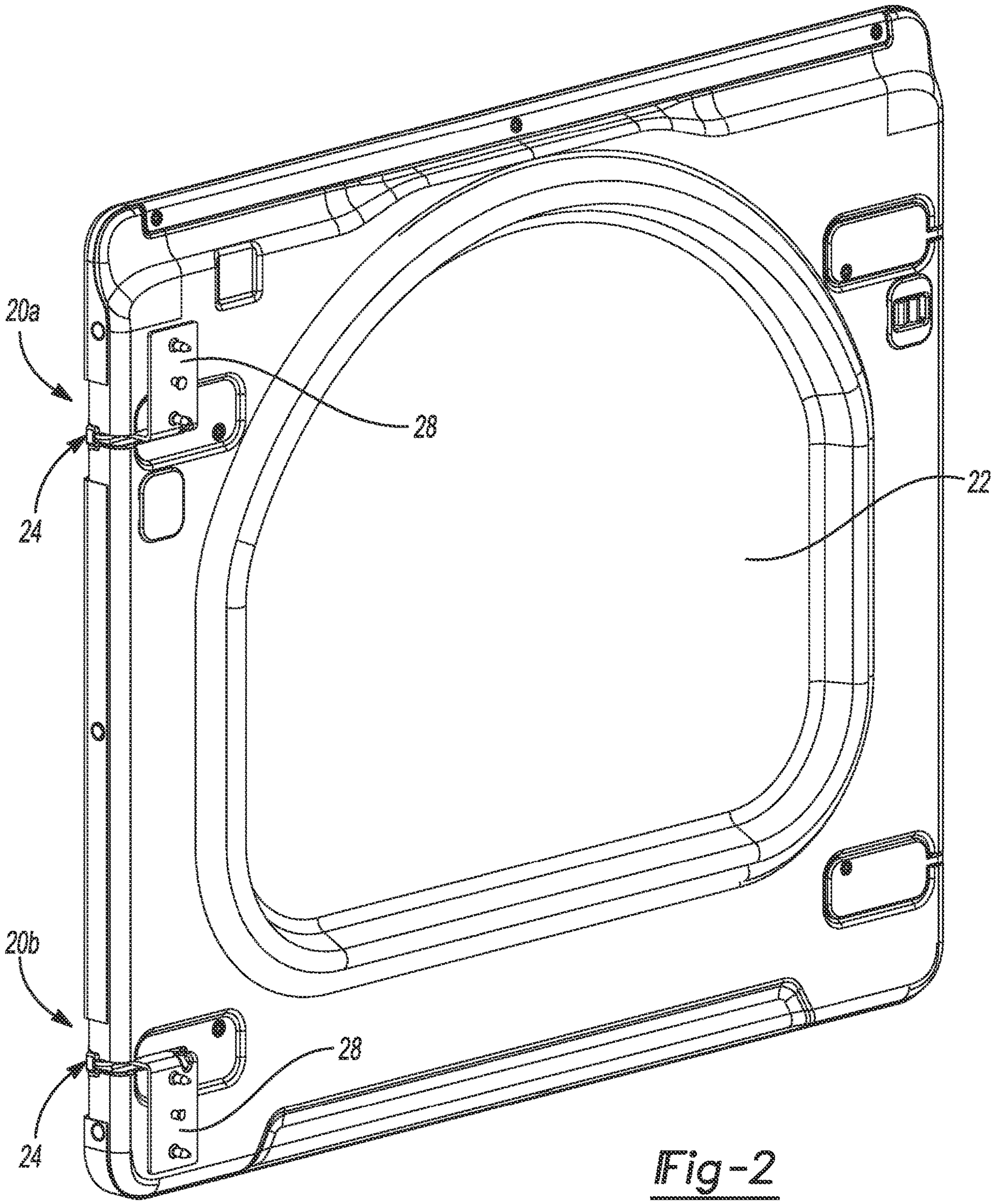
FIG. 2 is a rear perspective view of exemplary spring-loaded hinge assemblies that are mounted to the exemplary appliance door shown in FIG. 1 and that are constructed in accordance with the teachings of the present disclosure.
Figure 3:
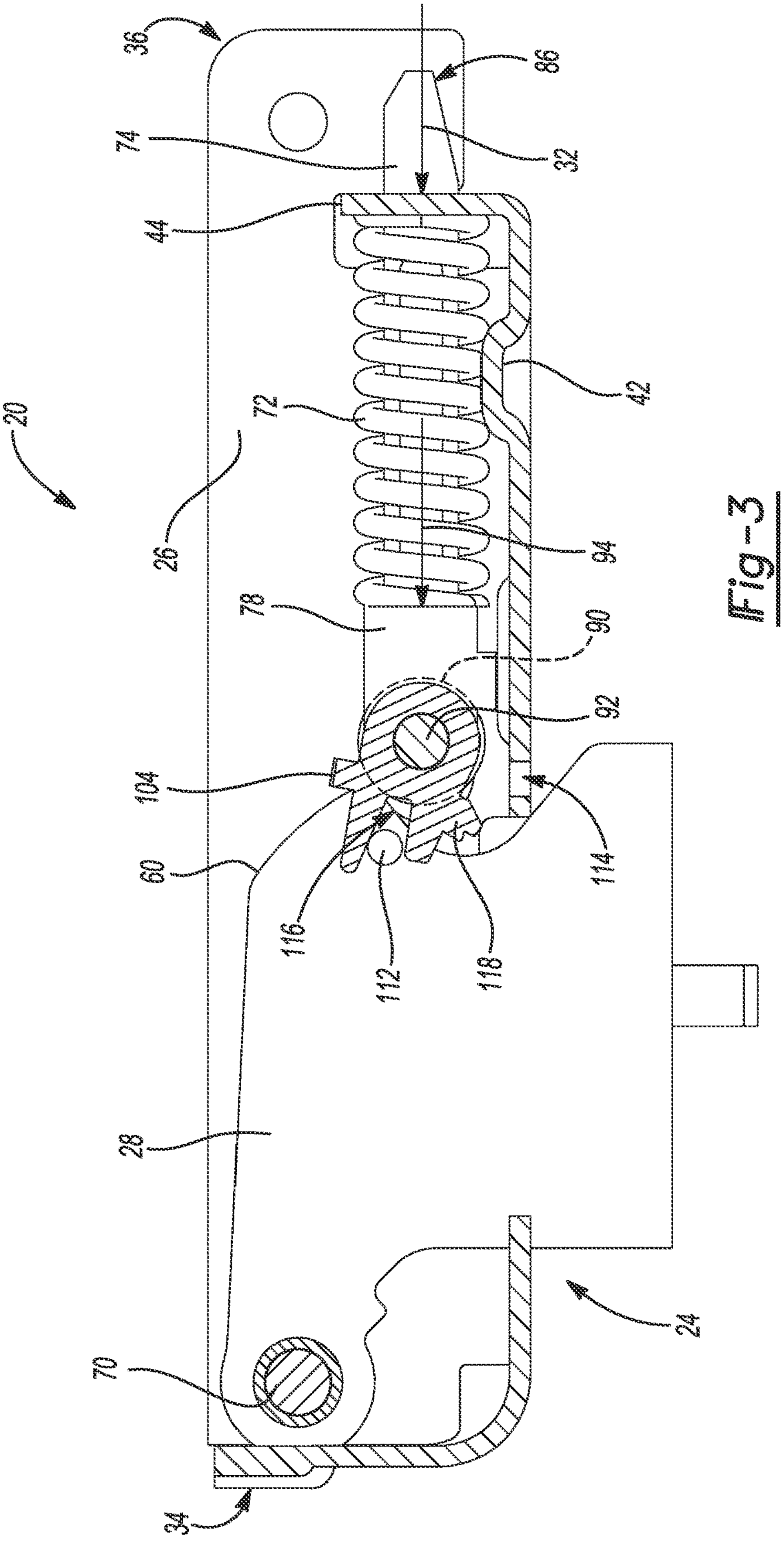
FIG. 3 is a side cross-section view of an exemplary spring-loaded hinge assembly that is constructed in accordance with the teachings of the present disclosure, where the spring-loaded hinge assembly includes a leaf that is illustrated in the closed position and a lock that is illustrated in the unlocked position.
Figure 4:
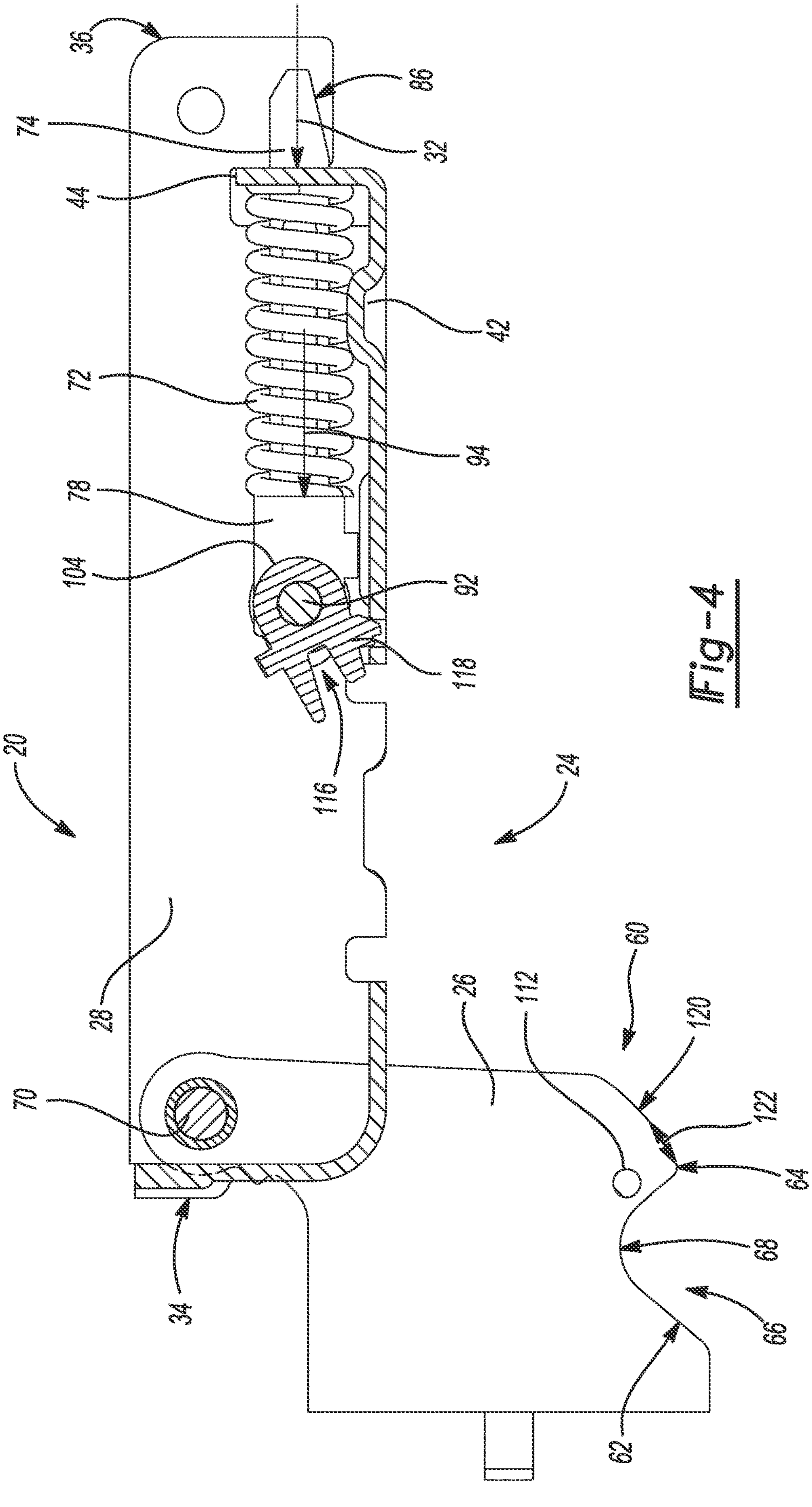
FIG. 4 is another side cross-section view of the exemplary spring-loaded hinge assembly shown in FIG. 3, where the leaf is illustrated in the open position and the lock is illustrated in the locked position.

With reference to FIGS. 1 and 2, two exemplary spring-loaded hinge assemblies 20*a*, 20*b* are shown attached to an exemplary appliance door 22. Each spring-loaded hinge assembly 20*a*, 20*b* includes a hinge mechanism 24 that has a hinge support bracket 26 and a leaf 28. As best seen in FIG. 1, the hinge support bracket 26 is configured to be secured to the appliance door 22 and is installed in a pocket 30 in the appliance door 22. As best appreciated from FIG. 2, at least part of the leaf 28 of the hinge mechanism 24 extends out from the pocket 30 in the appliance door 22 and is configured to be secured to the appliance (not shown). The leaf 28 is pivotally mounted to the hinge support bracket 26 such that the leaf 28 is configured to swing between open and closed positions, which are shown in FIGS. 3 and 4. Although other configurations are possible, the hinge support bracket 26 may be secured to the appliance door 22 and the leaf 28 may be secured to the appliance, or vice versa, by a fixed connection, which may include, without limitation, fasteners, adhesive, welding, or soldering. Alternatively, the hinge support bracket 26 may be integrally formed with part of the appliance door 22 and the leaf 28 may be integrally formed with part of the appliance, or vice versa.

In the illustrated example, the appliance door 22 is a dryer door, which would be pivotally attached to the appliance, which in this example is a dryer, by the spring-loaded hinge assemblies 20. As should be appreciated, the appliance door 22 in this example forms a closure for a front laundry access opening of a front-load dryer and the spring-loaded hinge assemblies 20*a*, 20*b* provide a spring force that is sufficient to hold the appliance door 22 shut during tumbling. It should be appreciated however, that the spring-loaded hinge assembly 20 disclosed herein may find utility when used on other appliances, including without limitation, top-load dryers, front-load and top-load washing machines, and other residential or commercial laundry appliances.

Figure 5:
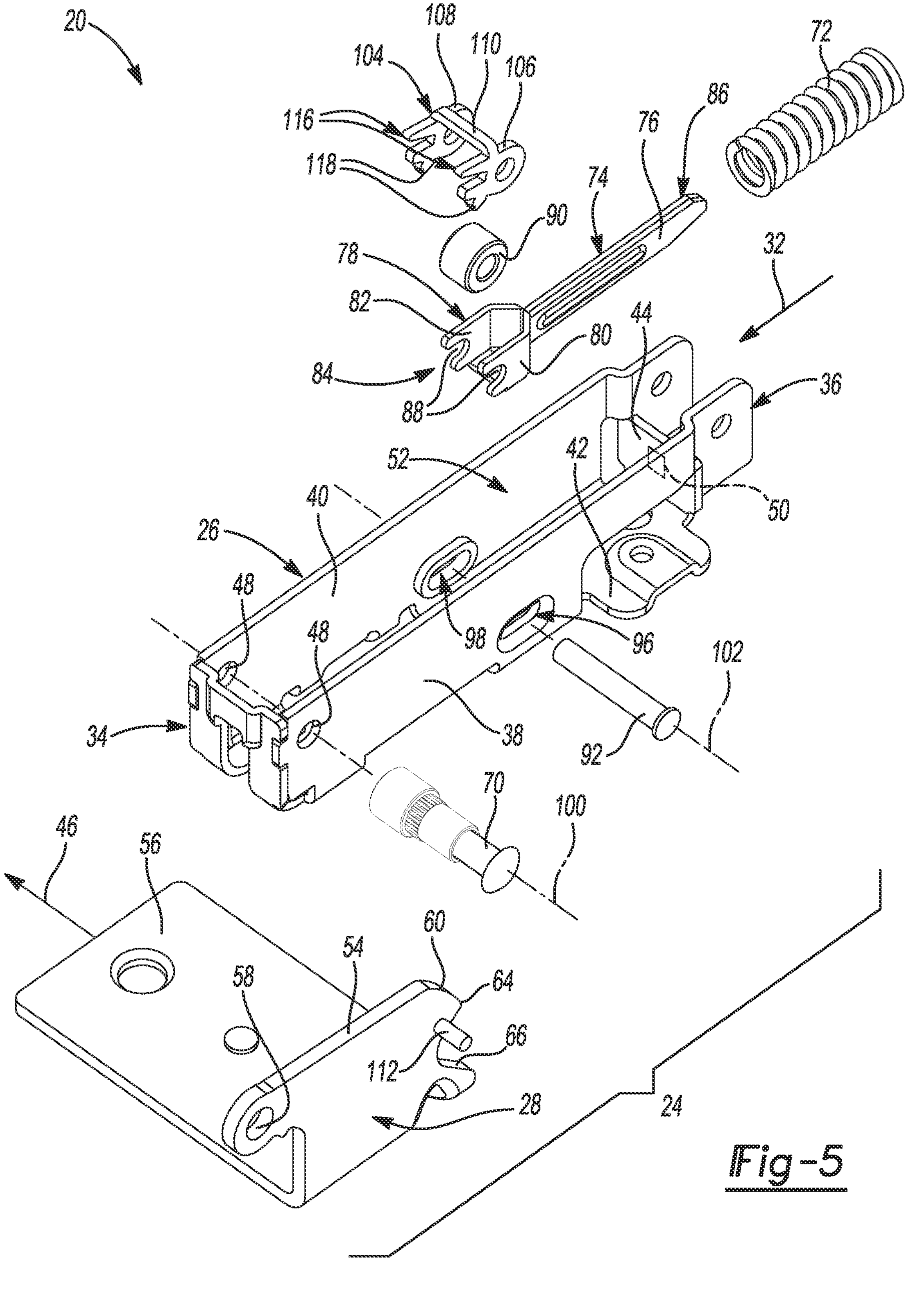
FIG. 5 is an exploded perspective view of the exemplary spring-loaded hinge assembly shown in FIG. 3.
Figure 6:
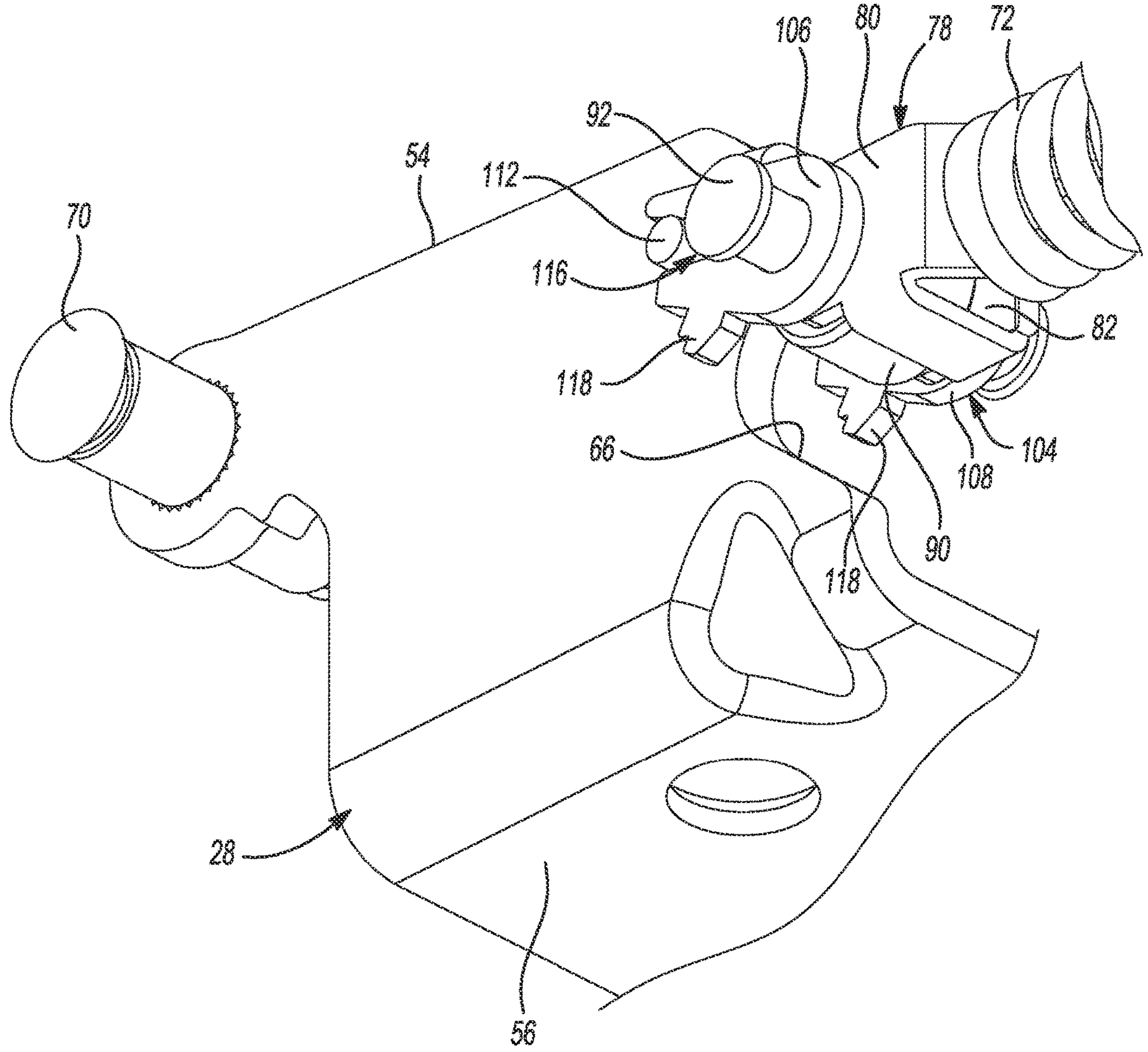
FIG. 6 is an enlarged perspective view illustrating the leaf and lock components of the exemplary spring-loaded hinge assembly shown in FIG. 3.
Figure 7:
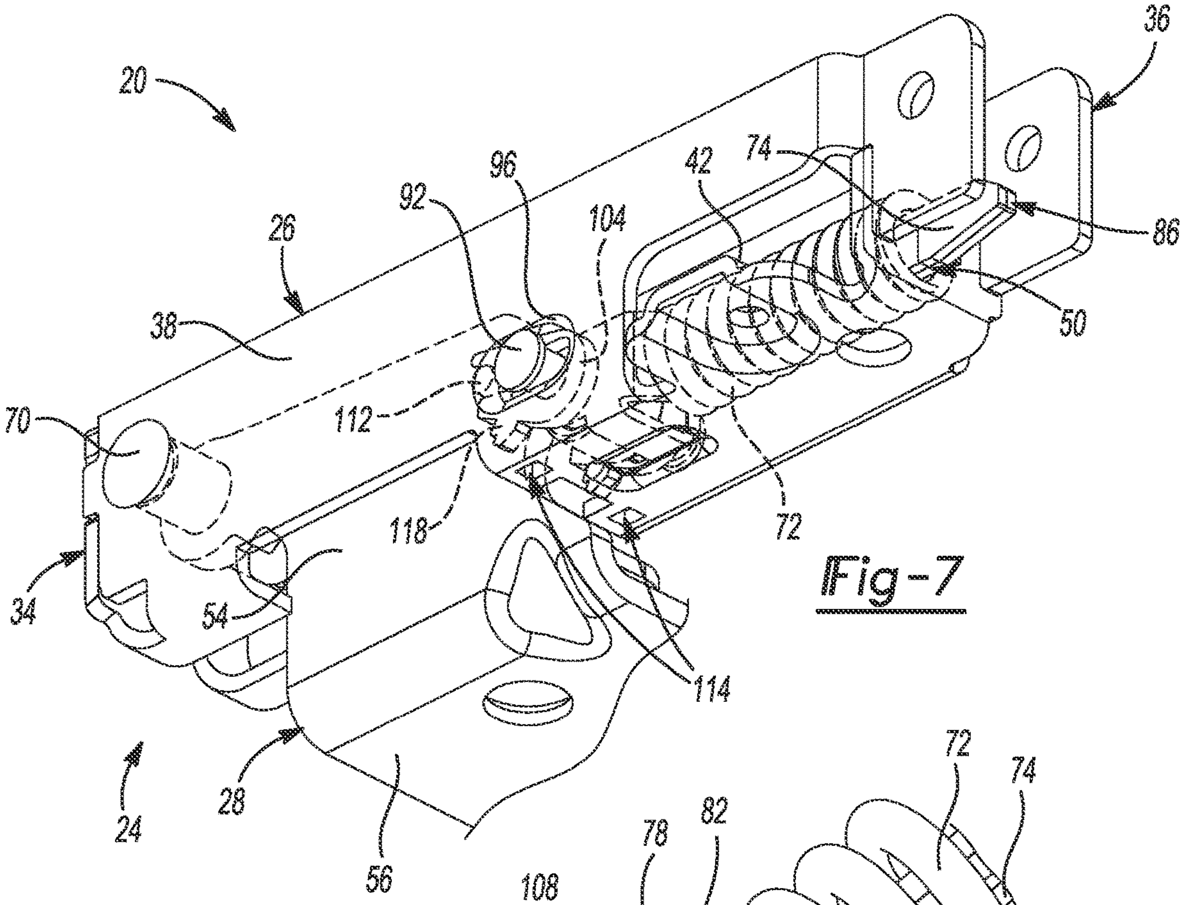
FIG. 7 is a side perspective view of the exemplary spring-loaded hinge assembly shown in FIG. 3, where the exemplary spring-loaded hinge assembly includes a coil spring and spring support member that are illustrated in dashed lines.
Figure 8:
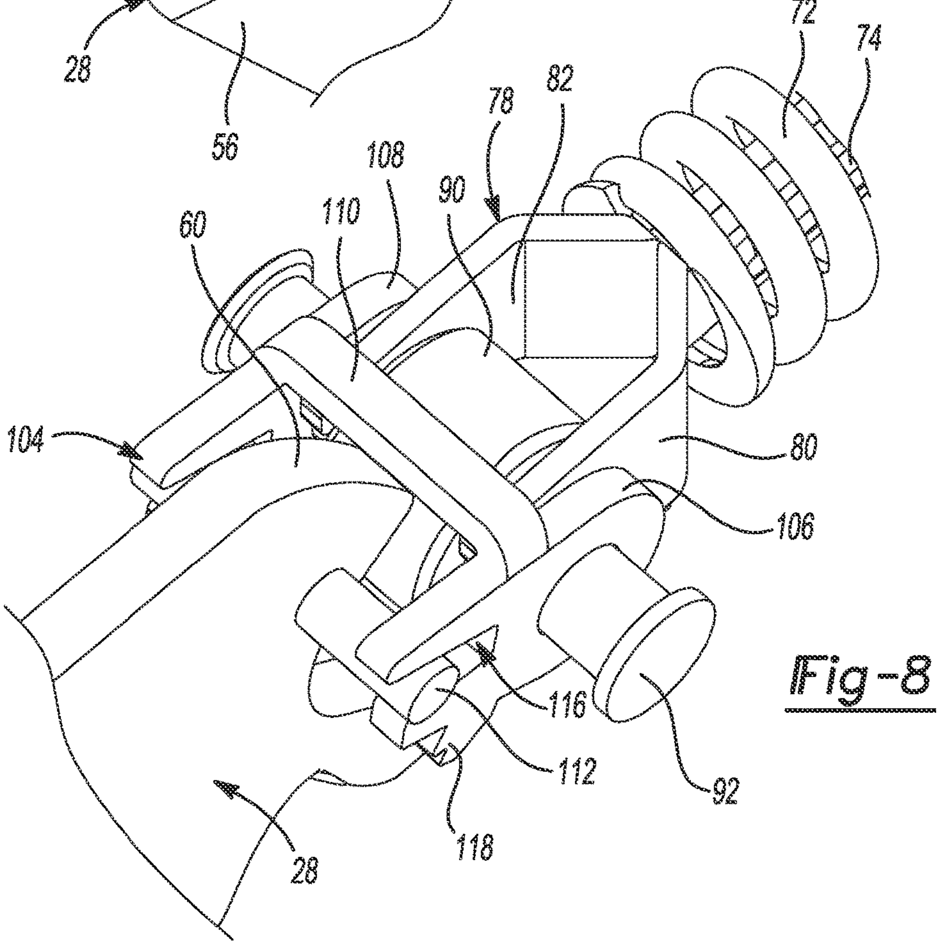
FIG. 8 is an enlarged perspective view illustrating the lock and portions of the leaf, coil spring, and spring support member of the exemplary spring-loaded hinge assembly shown in FIG. 3.

Referring now to FIGS. 3-5, the hinge mechanism 24 of one spring-loaded hinge assembly 20 is illustrated. The hinge support bracket 26 generally extends in a longitudinal direction 32 between a first support bracket end 34 and a second support bracket end 36. It should thus be appreciated that references to "longitudinal" or "longitudinally" refer to directions and elements that are substantially parallel to or arranged along the longitudinal direction 32 labeled in FIGS. 3 and 4. The hinge support includes a first side plate 38, a second side plate 40, a bridge portion 42 that interconnects the first and second side plates 38, 40, and a flange 44 that extends in a transverse direction 46 between the first and second side plates 38, 40 at the second support bracket end 36. Pivot mounting holes 48 are provided in the first and second side plates 38, 40 at the first support bracket end 34 and a window 50, that is rectangular in shape, extends through the flange 44. In the illustrated example, the first and second side plates 38, 40 run parallel to each other and define a longitudinal channel 52 in the hinge support bracket 26. Although other configurations are possible, the first side plate 38, the second side plate 40, the bridge portion 42, and the flange 44 of the hinge support bracket 26 are all integral with one another in the illustrated example and may be made of metal or a polymeric material.

The leaf 28 of the spring-loaded hinge assembly 20 includes a first leaf portion 54 that is at least partially received in the longitudinal channel 52 of the hinge support bracket 26 when the leaf 28 is in the closed position (FIG. 3) and a second leaf portion 56 that is configured to be secured to the appliance. The first leaf portion 54 includes a pivot bore 58 and a cam 60 opposite the pivot bore 58. The cam 60 has a side profile 62 that follows an S-like shape with a nose 64 and a trough 66. The nose 64 of the cam 60 includes the furthest most point on the cam 60 from the pivot bore 58 and the trough 66 of the cam 60 includes an inflection point 68 that is the closest in distance to the pivot bore 58 compared to all other points in the trough 66. Although other configuration are possible, in the illustrated example, the first and second leaf portions 54, 56 are integral with each other and are arranged at a perpendicular angle relative to one another. Also, like the hinge support bracket 26, the leaf 28 may be made of metal or a polymeric material, for example. A leaf pivot 70 extends through the pivot bore 58 in the leaf 28 and the pivot mounting holes 48 in the first and second side plates 38, 40 to pivotally couple the leaf 28 to the hinge support bracket 26, thus allowing the leaf 28 to swing/rotate about the leaf pivot 70 between the closed position (FIG. 3) and the open position (FIG. 4).

The spring-loaded hinge assembly 20 further comprises a coil spring 72 that is mounted on a spring support member 74. Both the coil spring 72 and the spring support member 74 are positioned in the longitudinal channel 52 of the hinge support bracket 26. The spring support member 74 includes a pivot arm 76 and a yoke 78. The yoke 78 includes a first leg 80 and a second leg 82, which are parallel to each other and extend longitudinally. The pivot arm 76 extends longitudinally from a proximal end 84 adjacent to the yoke 78 to a distal end 86 that extends through the window 50 in the flange 44 of the hinge support bracket 26 in sliding engagement. As a result, the coil spring 72 and spring support member 74 can tilt slightly relative to the hinge support bracket 26. The coil spring 72 is supported on the spring support member 74 in such a way that the coil spring 72 extends helically about the pivot arm 76 and longitudinally between the flange 44 of the hinge support bracket 26 and the yoke 78 of the spring support member 74. By way of non-limiting example, the spring support member 74 may be made of metal or a polymeric material.

The first and second legs 80, 82 of the yoke 78 include pivot roller cradles 88. A pivot bush 90 is rotatably supported between the first and second legs 80, 82 of the yoke 78 by a pivot roller 92 that extends through the pivot bush 90 and is received in the first and second pivot roller cradles 88 of the first and second legs 80, 82. As such, the pivot bush 90 is rotatable relative to the yoke 78 and is positioned to contact the cam 60. Movement of the pivot bush 90 along the cam 60, and along the nose 64 of the cam 60 in particular, compresses the coil spring 72 when the leaf 28 is rotated towards and away from the closed position. The coil spring 72 applies a biasing force 94 to the yoke 78 when the leaf 28 is in the closed position, which operates in the longitudinal direction 32 to push the pivot bush 90 against the cam 60, forcing the pivot bush 90 to settle in the inflection point 68 of the trough 66. As a result, further compression of the coil spring 72 and thus an associated force is required to rotate the leaf 28 away from the closed position. This is what holds the appliance door 22 closed during operation of the appliance, such as during tumbling. The biasing force 94 of the coil spring 72 also defines an associated closing force of the spring-loaded hinge assembly 20, which is the force required to compress the coil spring 72 to the point where the pivot bush 90 rides past the nose 64 and into the trough 66 of the cam 60. Advantageously, design of the spring-loaded hinge assembly 20 described herein reduces this closing force for reasons that will be explained below.

As best seen in FIG. 5, the first side plate 38 of the hinge support bracket 26 includes a first slot 96 and the second side plate 40 of the hinge support bracket 26 includes a second slot 98. The first and second slots 96, 98 in the first and second side plates 38, 40 are elongated in the longitudinal direction 32 and receive the pivot roller 92 in sliding engagement. In addition, the leaf pivot 70 extends co-axially about a leaf pivot axis 100 and the pivot roller 92 extends co-axially about a pivot roller axis 102. The leaf pivot axis 100 and the pivot roller axis 102 run parallel to one another and are perpendicular to the longitudinal direction 32.

The spring-loaded hinge assembly 20 also includes a lock 104 that is pivotally supported on the pivot roller 92. As such, the lock 104 is rotatable relative to both the yoke 78 of the spring support member 74 and the first and second side plates 38, 40 of the hinge support bracket 26 between an unlocked position (FIG. 3) and a locked position (FIG. 4). As best seen in FIGS. 5-8, in the illustrated example, the lock 104 includes a first lock fork 106 and a second lock fork 108, which are interconnected by a cross-piece 110. The first and second lock forks 106, 108 run parallel to each other. A portion of the first lock fork 106 is sandwiched between the first leg 80 of the yoke 78 and the first side plate 38 of the hinge support bracket 26. Similarly, a portion of the second lock fork 108 is sandwiched between the second leg 82 of the yoke 78 and the second side plate 40 of the hinge support bracket 26. By way of non-limiting example, the lock 104 may be made of metal or a polymeric material.

The leaf 28 includes a leaf pin 112 that extends through the first leaf portion 54 in the transverse direction 46. The leaf pin 112 is positioned in a location that is adjacent to the cam 60 and the bridge portion 42 of the hinge support bracket 26 includes an engagement feature 114. Although other configurations may be possible, in the illustrated example, the engagement feature 114 is a pair of apertures in the bridge portion 42 of the hinge support bracket 26.

Each of the first and second lock forks 106, 108 includes a notch 116 that is positioned to receive the leaf pin 112 when the leaf 28 is in the closed position. Further, it should be appreciated that the shape and placement of the notch 116 causes the lock 104 to rotate about the pivot roller axis 102 from the unlocked position to the locked position when the leaf 28 is rotated from the closed position to the open position. Additionally, each of the first and second lock forks 106, 108 includes a finger 118 that is positioned to engage the engagement feature 114 in the bridge portion 42 of the hinge support bracket 26 when the lock 104 rotates to the locked position. In other words, as the leaf 28 swings away from the closed position and towards the open position, the fingers 118 on the first and second lock forks 106, 108 engage the apertures in the bridge portion 42 of the hinge support bracket 26. This in turn holds the coil spring 72 in a partially compressed, pre-load condition and the pivot bush 90 at a partially retracted position relative to the cam 60 until the lock 104 is released by contact between the cam 60 and the pivot bush 90 during a subsequent closure of the hinge mechanism 24.

The cam 60 has a contact point 120 where the pivot bush 90 first makes contact with the cam 60 as the leaf 28 swings from the open position towards the closed position. This contact point 120 is located above the nose 64 of the cam 60. The partially retracted position of the pivot bush 90 when the lock 104 is in the locked position moves the contact point 120 down on the cam 60 and closer to the nose 64 of the cam 60 to reduce a length 122 along which the pivot bush 90 travels across the cam 60 between the contact point 120 and the nose 64. This reduces the closing force of the spring-loaded hinge assembly 20 since the coil spring 72 is held under pre-load by the lock 104 after the appliance door 22 is opened. Also, by reducing the length 122 across which the pivot bush 90 travels along the cam 60 between the contact point 120 and the nose 64, the closing force/resistance operates in only the last five to ten degrees of closure, which is an improvement over traditional spring-loaded hinge designs.

Many modifications and variations of the apparatus and assemblies described in the present disclosure are possible in light of the above teachings and may be practiced otherwise than as specifically described while within the scope of the appended claims. These antecedent recitations should be interpreted to cover any combination in which the inventive novelty exercises its utility.

What is claimed is:

1. A spring-loaded hinge assembly comprising:

a hinge mechanism including a hinge support bracket and a leaf pivotally mounted to said hinge support bracket such that said leaf is configured to swing between a hinge open position and a hinge closed position, said leaf including a cam;

a coil spring supported on a spring support member;

a pivot bush rotatably supported on said spring support member and positioned to contact said cam;

said coil spring applying a biasing force to said spring support member that operates to push said pivot bush against said cam; and a lock that is rotatable relative to said leaf, said spring support member, and said hinge support bracket between locked and unlocked positions, said lock including a finger that is positioned to engage an engagement feature of said hinge support bracket when said lock rotates to said locked position as said leaf swings toward said hinge open position, wherein in said hinge open position, said finger of said lock engages said engagement feature, said lock does not engage said leaf, and said pivot bush does not contact said cam, wherein in said hinge closed position, said lock engages said leaf, said finger of said lock does not engage said engagement features, and said pivot bush contacts said cam.

2. The spring-loaded hinge assembly as set forth in claim 1, wherein said cam has a nose and a trough and a contact point where said pivot bush first makes contact with said cam as said leaf swings from said hinge open position toward said hinge closed position.

3. The spring-loaded hinge assembly as set forth in claim 2, further comprising:

a leaf pin that is fixed to said leaf of said hinge mechanism; and a notch in said lock that is positioned to receive said leaf pin when said leaf is in said hinge closed position, wherein contact between said leaf pin and said notch causes said lock to rotate from said unlocked position to said locked position when said leaf is rotated from said hinge closed position toward said hinge open position.

4. The spring-loaded hinge assembly as set forth in claim 3, further comprising:

a pivot roller that extends through said pivot bush and first and second slots positioned in said hinge support bracket;

said pivot roller extending co-axially along a pivot roller axis; and said lock being pivotally mounted on said pivot roller such that said rock is rotatable about said pivot roller axis between said locked and unlocked positions.

5. The spring-loaded hinge assembly as set forth in claim 4, wherein said spring support member includes a pivot arm and a yoke, said yoke including first and second pivot roller cradles that receive said pivot roller such that said pivot bush is received between said pivot roller cradles and is rotatable relative to said yoke.

6. The spring-loaded hinge assembly as set forth in claim 5, wherein said hinge support bracket includes a flange that has a window and wherein a portion of said pivot arm of said spring support member extends through said window in said flange in sliding engagement such that said pivot arm of said spring support member is permitted to tilt relative to said hinge support bracket.

7. The spring-loaded hinge assembly as set forth in claim 6, wherein said coil spring extends helically about said pivot arm of said spring support member and longitudinally between said flange of said hinge support bracket and said yoke of said spring support member and is configured to apply said biasing force to said yoke when said coil spring is compressed by movement of said pivot bush along said cam.

8. The spring-loaded hinge assembly as set forth in claim 3, wherein said engagement feature comprises an aperture in said hinge support bracket that is positioned to receive said finger of said lock when said lock rotates to said locked position as said leaf swings toward said hinge open position.

9. The spring-loaded hinge assembly as set forth in claim 1, wherein said hinge support bracket configured to be secured to an appliance door and said leaf is configured to be secured to an appliance.

10. A spring-loaded hinge assembly for pivotally mounting an appliance door to an appliance, said spring-loaded hinge assembly comprising:

a hinge mechanism including a hinge support bracket and a leaf pivotally mounted to said hinge support bracket such that said leaf is configured to swing between a hinge open position and a hinge closed position, said leaf including a cam;

a spring support member including a pivot arm and a yoke, said pivot arm arranged in sliding engagement with said hinge support bracket;

a coil spring supported on said spring support member where said coil spring extends helically about said pivot arm of said spring support member;

a pivot bush rotatably supported in said yoke by a pivot roller such that said pivot bush is rotatable relative to said yoke and is positioned to contact said cam and compress said coil spring when said leaf is rotated from said closed position towards said open position; and a lock, pivotally supported on said pivot roller, that is rotatable relative to both said spring support member and said hinge support bracket between locked and unlocked positions, said lock including at least one finger that is positioned to engage an engagement feature on said hinge support bracket when said lock rotates to said locked position as said leaf swings toward said hinge open position, wherein in said hinge open position, said finger of said lock engages said engagement feature, said lock does not engage said leaf, and said pivot bush does not contact said cam, wherein in said hinge closed position, said lock engages said leaf, said finger of said lock does not engage said engagement feature, and said pivot bush contacts said cam.

11. The spring-loaded hinge assembly as set forth in claim 10, wherein said cam has a nose and a trough and a contact point where said pivot bush first makes contact with said cam as said leaf swings from said hinge open position toward said hinge closed position.

12. The spring-loaded hinge assembly as set forth in claim 11, further comprising:

a leaf pin that extends through said leaf in a location that is adjacent to said cam.

13. The spring-loaded hinge assembly as set forth in claim 12, wherein said lock includes first and second lock forks that are interconnected by at least one cross-piece and wherein each of said first and second lock forks includes a notch that is positioned to receive said leaf pin when said leaf is in said hinge closed position and wherein contact between said leaf pin and said notch causes said lock to rotate about said pivot roller from said unlocked position to said locked position when said leaf is rotated to said hinge open position.

14. The spring-loaded hinge assembly as set forth in claim 13, wherein said engagement feature comprises a pair of apertures in said hinge support bracket and each of said first and second lock forks includes a finger that is positioned to engage one of said apertures in said hinge support bracket when said lock rotates to said locked position as said leaf swings toward said hinge open position.

15. The spring-loaded hinge assembly as set forth in claim 14, wherein said hinge support bracket includes first and second side plates that are interconnected by a bridge portion, said first and second side plates defining a longitudinal channel in said hinge support bracket that receives at least part of said spring support member and said coil spring.

16. The spring-loaded hinge assembly as set forth in claim 15, further comprising:

first and second slots positioned in said first and second side plates of said hinge support bracket, respectively, that are elongated in a longitudinal direction and receive said pivot roller in sliding engagement.

17. The spring-loaded hinge assembly as set forth in claim 16, wherein said leaf includes a first leaf portion that is at least partially received in said longitudinal channel of said hinge support bracket when said leaf is in said hinge closed position and a second leaf portion that is configured to be secured to the appliance.

18. The spring-loaded hinge assembly as set forth in claim 17, wherein said first leaf portion includes said cam and a pivot bore, opposite said cam, that receives a leaf pivot that pivotally couples said leaf to said hinge support bracket.

19. The spring-loaded hinge assembly as set forth in claim 16, wherein said yoke includes first and second legs that extend longitudinally and have pivot roller cradles that engage said pivot roller such that said pivot bush is positioned between said first and second legs of said yoke and transmit said biasing force of said coil spring to said pivot roller to hold said pivot bush against said cam when said leaf is in said hinge closed position.

20. A spring-loaded hinge assembly for pivotally mounting an appliance door to an appliance, said spring-loaded hinge assembly comprising:

a hinge mechanism including a hinge support bracket and a leaf pivotally mounted to said hinge support bracket such that said leaf is configured to swing between a hinge open position and a hinge closed position, said hinge support bracket configured to be secured to the appliance door;

said hinge support bracket extending in a longitudinal direction between first and second support bracket ends;

said hinge support bracket including first and second side plates that are interconnected by a bridge portion, pivot mounting holes in said first and second side plates at said first support bracket end, and a flange that extends in a transverse direction between said first and second side plates at said second support bracket end;

said flange of said hinge support bracket including a window extending therethrough;

said first and second side plates extend parallel to each other to define a longitudinal channel in said hinge support bracket;

said leaf including a first leaf portion that is at least partially received in said longitudinal channel of said hinge support bracket when said leaf is in said hinge closed position and a second leaf portion that is configured to be secured to the appliance;

said first leaf portion including a pivot bore and a cam opposite said pivot bore, said cam having a side profile that follows an S-like shape with a nose and a trough;

a leaf pivot that extends through said pivot bore in said leaf and said pivot mounting holes in said first and second side plates;

a spring support member positioned in said longitudinal channel of said hinge support bracket;

said spring support member including a pivot arm and a yoke, said yoke including first and second legs that terminate at a pair of pivot roller cradles, and said pivot arm extending through said window in said flange of said hinge support bracket in sliding engagement;

a coil spring supported on said spring support member where said coil spring extends helically about said pivot arm of said spring support member and longitudinally between said flange of said hinge support bracket and said yoke of said spring support member;

a pivot bush rotatably supported between said first and second legs of said yoke by a pivot roller that extends through said pivot bush and that is received in said first and second pivot roller cradles such that said pivot bush is rotatable relative to said yoke and is positioned to contact said cam and compress said coil spring when said leaf is in said hinge closed position;

said cam has a contact point where said pivot bush first makes contact with said cam as said leaf swings from said hinge open position toward said hinge closed position;

said coil spring being configured to apply a biasing force to said yoke when said leaf is in said hinge closed position that operates in said longitudinal direction to push said pivot bush against said cam and that defines an associated closing force of said spring-loaded hinge assembly;

first and second slots positioned in said first and second side plates of said hinge support bracket, respectively, that are elongated in said longitudinal direction and receive said pivot roller in sliding engagement;

a lock pivotally supported on said pivot roller such that said lock is rotatable relative to both said yoke of said spring support member and said first and second side plates of said hinge support bracket between locked and unlocked positions;

said lock including first and second lock forks that are interconnected by at least one cross-piece, said first and second lock forks extending parallel to each other where at least a portion of said first lock fork is sandwiched between said first leg of said yoke and said first side plate of said hinge support bracket and at least a portion of said second lock fork is sandwiched between said second leg of said yoke and said second side plate of said hinge support bracket;

said leaf including a leaf pin that extends through said first leaf portion in a transverse direction that is perpendicular to said longitudinal direction and in a location that is adjacent to said cam;

said bridge portion of said hinge support bracket including at least one engagement feature comprising a pair of apertures in said bridge portion of said hinge support bracket;

each of said first and second lock forks including a notch that is positioned to receive said leaf pin when said leaf is in said hinge closed position such that contact between said leaf pin and said notch causes said lock to rotate about said pivot roller axis from said unlocked position to said locked position when said leaf is rotated to said hinge open position; and each of said first and second lock forks including a finger that is positioned to engage said engagement feature in said bridge portion of said hinge support bracket when said lock rotates to said locked position as said leaf swings toward said hinge open position, wherein in said hinge open position, said finger of said lock engages said engagement feature, said lock does not engage said leaf, and said pivot bush does not contact said cam, wherein in said hinge closed position, said lock engages said leaf, said finger of said lock does not engage said engagement feature, and said pivot bush contacts said cam.

* * * * *